(12) United States Patent
Li

(10) Patent No.: US 12,250,169 B2
(45) Date of Patent: Mar. 11, 2025

(54) RADIO FRAME ESTIMATION APPARATUS, SYSTEM, METHOD, PROGRAM, AND RECORDING MEDIUM

(71) Applicant: NEC Corporation, Tokyo (JP)

(72) Inventor: Tansheng Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 482 days.

(21) Appl. No.: 17/780,236

(22) PCT Filed: Dec. 13, 2019

(86) PCT No.: PCT/JP2019/048976
§ 371 (c)(1),
(2) Date: May 26, 2022

(87) PCT Pub. No.: WO2021/117230
PCT Pub. Date: Jun. 17, 2021

(65) Prior Publication Data
US 2022/0416970 A1      Dec. 29, 2022

(51) Int. Cl.
*H04L 5/00*      (2006.01)
*H04W 72/0446*  (2023.01)
*H04W 72/23*    (2023.01)

(52) U.S. Cl.
CPC ....... *H04L 5/0048* (2013.01); *H04W 72/0446* (2013.01); *H04W 72/23* (2023.01)

(58) Field of Classification Search
CPC .. H04L 5/0048; H04W 72/23; H04W 72/0446
See application file for complete search history.

(56) References Cited

U.S. PATENT DOCUMENTS

| 2002/0151306 | A1* | 10/2002 | Ohtani | H04B 7/2681 |
| | | | | 455/438 |
| 2007/0259666 | A1* | 11/2007 | Ohtani | H04B 7/2681 |
| | | | | 455/436 |
| 2012/0213178 | A1* | 8/2012 | Mizusawa | H04L 5/0091 |
| | | | | 370/329 |

(Continued)

FOREIGN PATENT DOCUMENTS

| JP | 2011-229086 A | 11/2011 |
| JP | 6029071 B2    | 11/2016 |

(Continued)

OTHER PUBLICATIONS

International Search Report for PCT Application No. PCT/JP2019/048976, mailed on Feb. 10, 2020.

*Primary Examiner* — Ajay Cattungal
(74) *Attorney, Agent, or Firm* — Sughrue Mion, PLLC

(57) ABSTRACT

In order to improve the accuracy of estimating the use rate of a radio channel, a radio frame estimation apparatus according to an example aspect of the present invention includes a radio frame combination section configured to combine a plurality of radio frame sets monitored by a plurality of radio communication units in an environment where radio communication is performed, and a radio frame estimation section configured to perform estimation about a number of radio frames in the based on the plurality of radio frame sets and a combined radio frame set obtained by combining the plurality of radio frame sets.

12 Claims, 17 Drawing Sheets

(56) References Cited

U.S. PATENT DOCUMENTS

| | | | |
|---|---|---|---|
| 2014/0087720 A1* | 3/2014 | Takano | H04B 7/0413 |
| | | | 455/422.1 |
| 2014/0094169 A1* | 4/2014 | Takano | H04L 5/0035 |
| | | | 455/434 |
| 2015/0312795 A1 | 10/2015 | Chou | |
| 2016/0057562 A1* | 2/2016 | Fang | H04L 1/0045 |
| | | | 370/329 |
| 2018/0159671 A1* | 6/2018 | Kim | H04W 72/0446 |
| 2020/0169954 A1* | 5/2020 | Namba | H04W 4/06 |
| 2020/0314954 A1* | 10/2020 | Li | H04W 80/02 |
| 2021/0297999 A1* | 9/2021 | Kim | H04W 72/0453 |
| 2022/0116881 A1* | 4/2022 | Shin | H04L 1/1861 |

FOREIGN PATENT DOCUMENTS

| | | |
|---|---|---|
| JP | 2017-515348 A | 6/2017 |
| JP | 2017-169003 A | 9/2017 |

\* cited by examiner

FIRST RADIO FRAME SET

| 1 |
| 2 |
| 3 |
| 5 |

COMBINED RADIO FRAME SET

| 1 |
| 2 |
| 3 |
| 5 |
| 6 |

SECOND RADIO FRAME SET

| 1 |
| 3 |
| 5 |
| 6 |

Fig. 9

RADIO FRAME ESTIMATION APPARATUS, SYSTEM, METHOD, PROGRAM, AND RECORDING MEDIUM

This application is a National Stage Entry of PCT/JP2019/048976 filed on Dec. 13, 2019, the contents of all of which are incorporated herein by reference, in their entirety.

BACKGROUND

Technical Field

The present invention relates to a radio frame estimation apparatus, a system, a method, a program, and a recording medium.

Background Art

Recent years have seen widespread use of the radio technology, and this has led to an increase in places using radio facilities. In particular, radio facilities using IEEE 802.11 series standards have been increasing. To use radio facilities, existing radio environments is to be evaluated. For example, in a case of installing a new radio device in an existing environment, the congestion degree of radio communication (the use rate of a radio channel) is one of important indices for evaluating the radio environment. This is because the radio channel is used exclusively due to characteristics of a physical medium. In a case where a certain physical channel is already in use, the performance of a radio device using the same channel deteriorates.

There is a technique for calculating the use rate of a radio channel. For example, PTL 1 discloses a technique for measuring a time period in which a radio channel is used for uplink/downlink communication and calculating the use rate of the radio channel. The use rate of the radio channel is calculated according to (time period in which the radio channel is used)/(total time). Note that the disclosure of PTL 1 is incorporated in the Specification by reference.

CITATION LIST

Patent Literature

[PTL 1] JP 6029071 B

SUMMARY

Technical Problem

In the technique disclosed in PTL 1, the use rate of the radio channel can be accurately calculated when all radio frames can be received. However, a general radio device cannot receive all radio frames in many cases. Not receiving a radio frame may occur randomly. Since radio frames that are not received are not included in the time period in which the radio channel is used, the time period in which the radio channel is used is estimated to be shorter than what actually is, and this reduces accuracy of estimating the use rate of the radio channel.

An example object of the present invention is to provide a radio frame estimation apparatus, a system, a method, a program, and a recording medium that can improve the accuracy of estimating the use rate of a radio channel.

Solution to Problem

A radio frame estimation apparatus according to an example aspect of the present disclosure includes a radio frame combination section configured to combine a plurality of radio frame sets monitored by a plurality of radio communication units in an environment where radio communication is performed; and a radio frame estimation section configured to perform estimation about a number of radio frames in the environment based on the plurality of radio frame sets and a combined radio frame set obtained by combining the plurality of radio frame sets.

A system according to an example aspect of the present disclosure includes a radio frame combination section configured to combine a plurality of radio frame sets monitored by a plurality of radio communication units in an environment where radio communication is performed; and a radio frame estimation section configured to perform estimation about a number of radio frames in the environment based on the plurality of radio frame sets and a combined radio frame set obtained by combining the plurality of radio frame sets.

A method according to an example aspect of the present disclosure includes combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

A program that causes a processor according to an example aspect of the present disclosure includes combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

A non-transitory computer readable recording medium having recorded thereon a program that causes a processor according to an example aspect of the present disclosure includes combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

Advantageous Effects of Invention

According to the present invention, it is possible to improve the accuracy of estimating the use rate of a radio channel. Note that, according to the present invention, instead of or together with the above effects, other effects may be exerted.

BRIEF DESCRIPTION OF THE DRAWINGS

FIG. 9 is an explanatory diagram for describing a first example of combination of radio frame sets;

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
  2. First Example Embodiment
  2.1. Configuration of System
  2.2. Configuration of Radio Frame Estimation Apparatus
  2.3. Configuration of Radio Device
  2.4. Operation
  2.5. First Example Alteration
  2.6. Second Example Alteration
  2.7. Third Example Alteration
  3. Second Example Embodiment
  3.1. Configuration of Radio Frame Estimation Apparatus
  3.2. Operation 1. Overview of Example Embodiments of the Present Invention First, an overview of example embodiments of the present invention will be described.

A radio frame estimation apparatus according to example embodiments of the present invention combines a plurality of radio frame sets monitored by a plurality of radio communication units in an environment where radio communication is performed.

The radio frame estimation apparatus further performs estimation about the number of radio frames in the environment, based on the plurality of radio frame sets and a combined radio frame set obtained by combining the plurality of radio frame sets. For example, the estimation includes estimating the number of radio frames that are not monitored by the plurality of radio communication units in the environment, estimating the number of all radio frames that are receivable in the environment, or estimating a ratio of radio frames monitored by each of the plurality of radio communication units.

According to these, it is possible to improve the accuracy of estimating the use rate of a radio channel, for example.

2. First Example Embodiment

Figure 1:
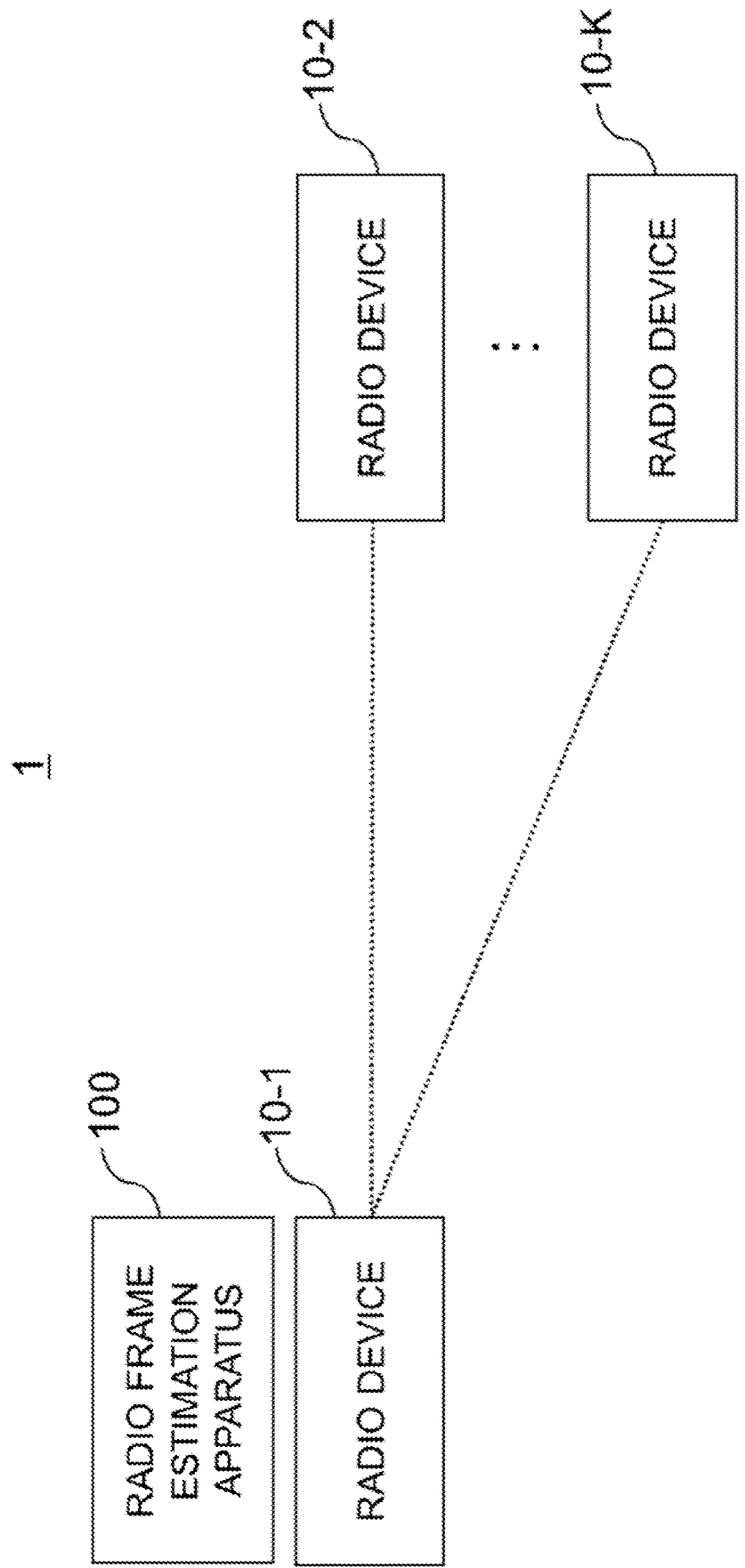
FIG. 1 is an explanatory diagram illustrating an example of a schematic configuration of a system 1 according to a first example embodiment.

A description will be given of a first example embodiment of the present invention with reference to FIGS. 1 to 15.
<2.1. Configuration of System>
FIG. 1 is an explanatory diagram illustrating an example of a schematic configuration of a system 1 according to the first example embodiment. With reference to FIG. 1, the system 1 includes K radio devices 10 (specifically, a radio device 10-1, a radio device 10-2, . . . , a radio device 10-K) and a radio frame estimation apparatus 100. K is a natural number.
(1) Radio Devices 10
Each of the radio devices 10 performs radio communication. For example, each of the radio devices 10 performs data communication in accordance with a protocol.

As an example, each of the radio devices 10 performs radio communication in a wireless local area network (LAN) (specifically, radio communication conforming to an IEEE 802.11 standard). In this case, each of the radio devices 10 is a wireless LAN access point or station. For example, each of the radio devices 10 is a wireless fidelity (Wi-Fi) (registered trademark) device.

The radio communication performed by each of the radio devices 10 is not limited to radio communication in the wireless LAN. For example, each of the radio devices 10 may perform Bluetooth (registered trademark) communication. Alternatively, each of the radio devices 10 may perform radio communication in a mobile communication network (in other words, radio communication conforming to a technical specification of the Third Generation Partnership Project (3GPP)). Specifically, for example, each of the radio devices 10 may perform radio communication conforming to a technical specification of Long Term Evolution (LTE) or 5G. In this case, each of the radio devices 10 may be a mobile station or a base station.
(2) Radio Frame Estimation Apparatus 100
As will be described later, the radio frame estimation apparatus 100 combines a plurality of radio frame sets monitored by a plurality of radio communication units in an environment where radio communication is performed (for example, an environment where the K radio devices 10 perform radio communication).

The radio frame estimation apparatus 100 further performs estimation about the number of radio frames in the environment, based on the plurality of radio frame sets and a combined radio frame set obtained by combining the plurality of radio frame sets.

(3) Installation

Figure 2:
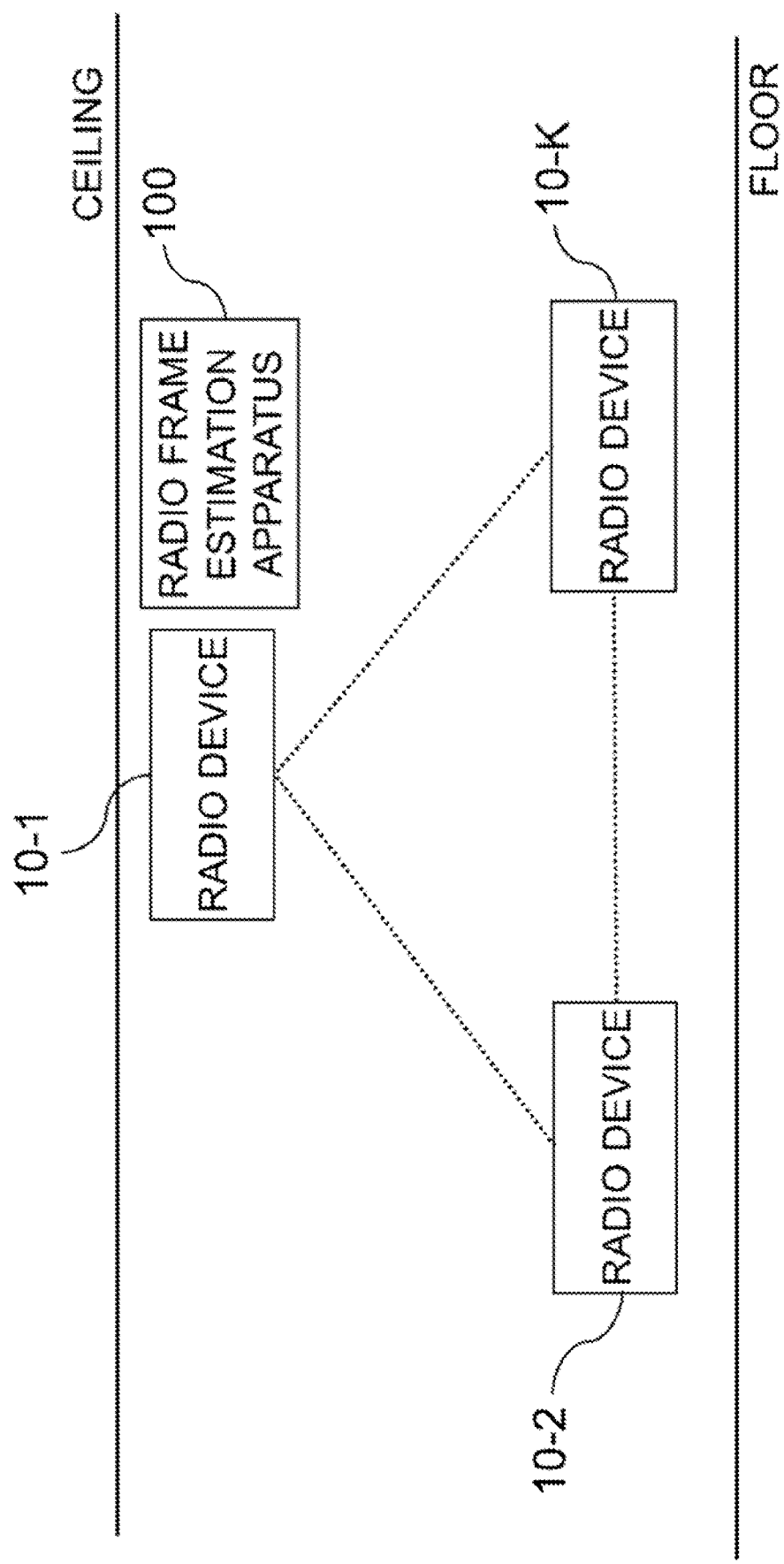
FIG. 2 is an explanatory diagram illustrating a first example of installation of a radio frame estimation apparatus and radio devices according to the first example embodiment.
Figure 3:
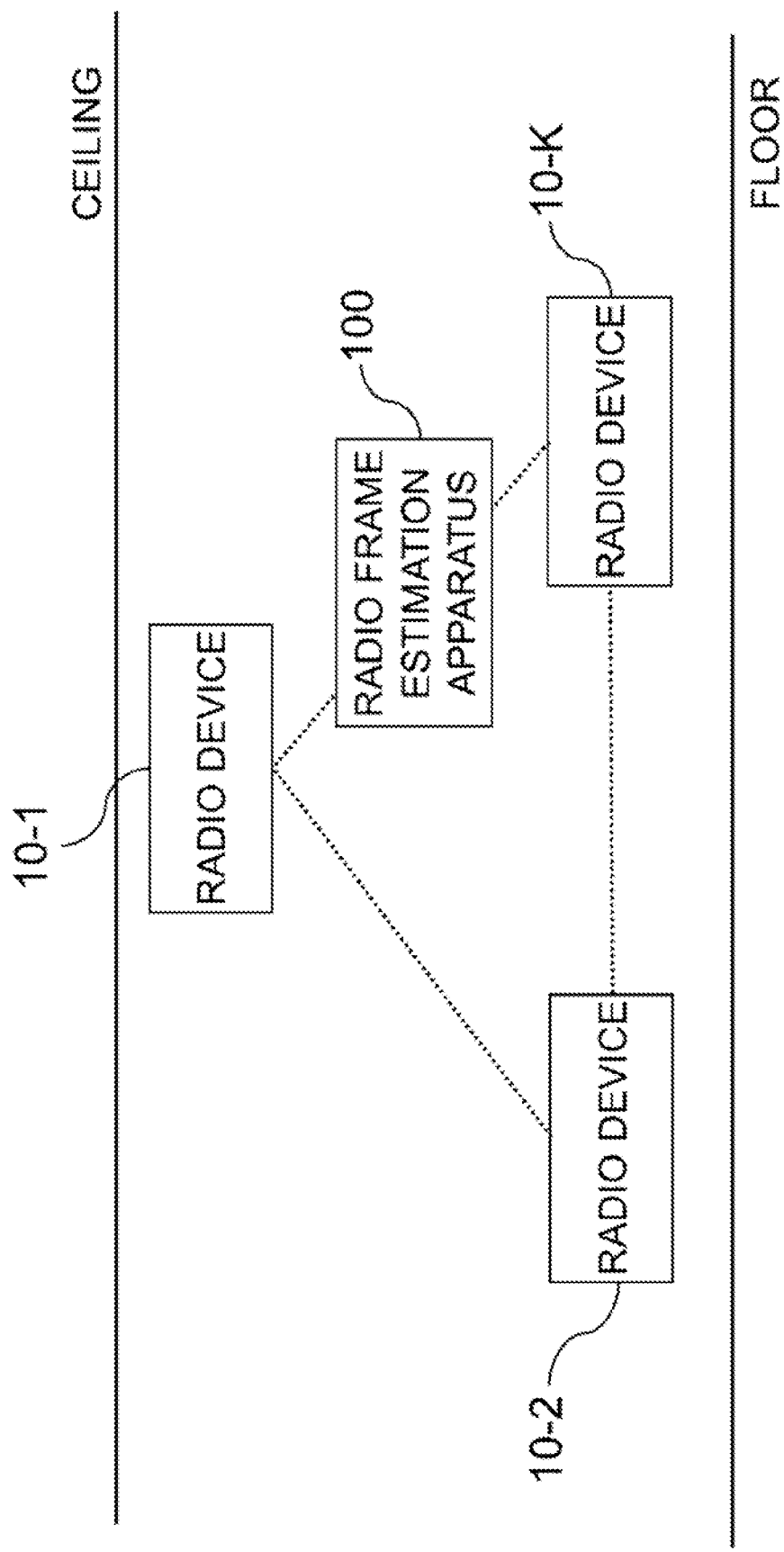
FIG. 3 is an explanatory diagram illustrating a second example of the installation of the radio frame estimation apparatus and the radio devices according to the first example embodiment.
Figure 4:
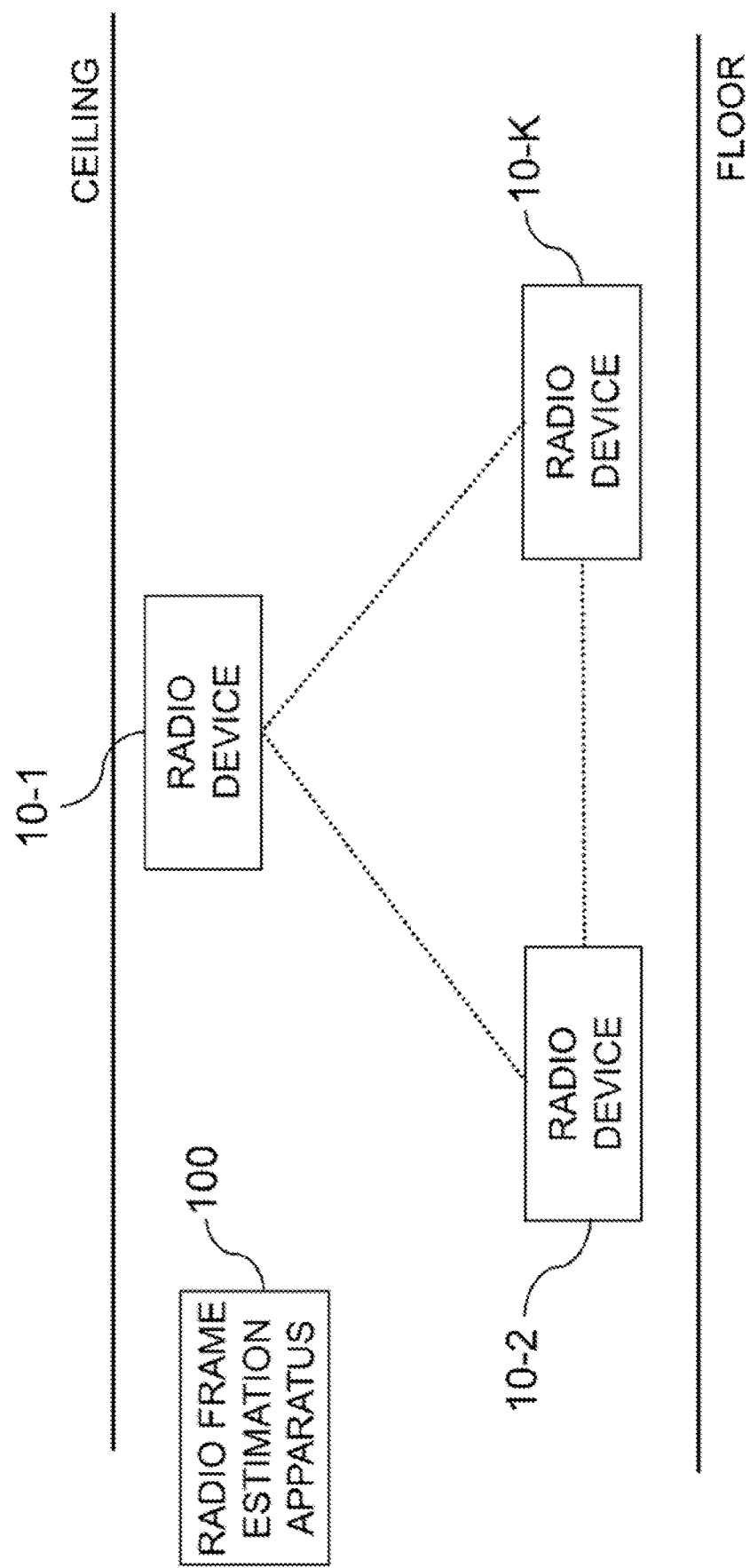
FIG. 4 is an explanatory diagram illustrating a third example of the installation of the radio frame estimation apparatus and the radio devices according to the first example embodiment.

As illustrated in FIGS. 2 to 4, for example, the radio device 10-1 may be installed at a ceiling while the radio devices 10-2, . . . , 10-K may be installed at a floor. As an example, the radio frame estimation apparatus 100 may be installed to be adjacent to the radio device 10-1 as illustrated in FIG. 2. As another example, the radio frame estimation apparatus 100 may be installed in a radio section between the radio devices 10 as illustrated in FIG. 3. As still another example, the radio frame estimation apparatus 100 may be installed in a place away from the radio section as illustrated in FIG. 4.

<2.2. Configuration of Radio Frame Estimation Apparatus>

(1) Configuration of Hardware

Figure 5:
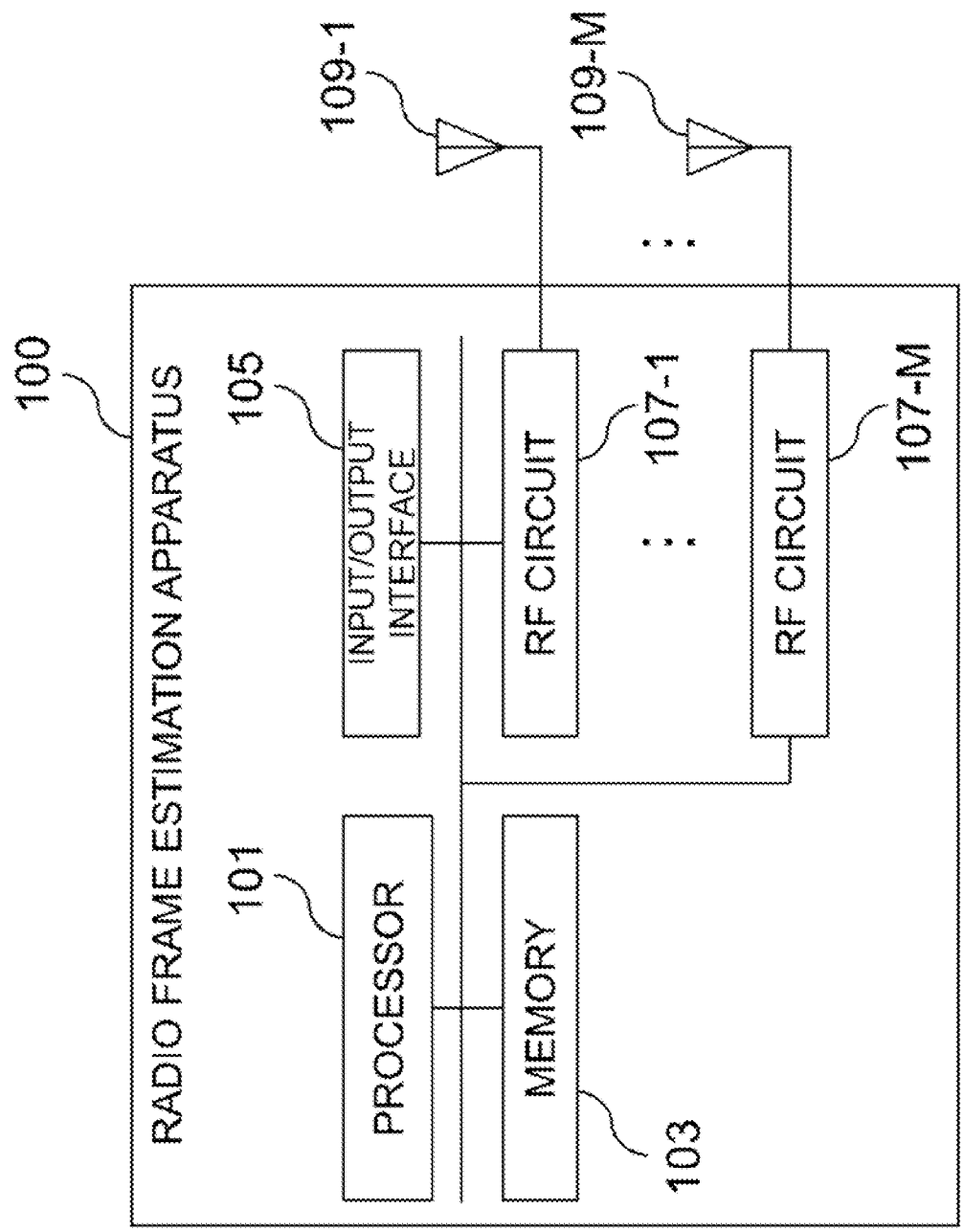
FIG. 5 is a block diagram illustrating an example of a schematic hardware configuration of the radio frame estimation apparatus according to the first example embodiment.

FIG. 5 is a block diagram illustrating an example of a schematic hardware configuration of the radio frame estimation apparatus 100 according to the first example embodiment. With reference to FIG. 5, the radio frame estimation apparatus 100 includes a processor 101, a memory 103, an input/output interface 105, M radio frequency (RF) circuits 107 (concretely, an RF circuit 107-1, . . . , an RF circuit 107-M), and M antennas 109 (concretely, an antenna 109-1, . . . , an antenna 109-M). The RF circuits are each, as a general definition, a circuit that communicates with an antenna in equipment having a radio function. Here, M is an integer equal to or greater than 2. The processor 101, the memory 103, the input/output interface 105, and the M RF circuits 107 are connected to each other via an internal bus. Each of the RF circuits 107 is connected to a corresponding one of the antennas 109.

The processor 101 is, for example, a central processing unit (CPU) and executes a program stored in the memory 103.

The memory 103 includes at least one of a random access memory (RAM), a read only memory (ROM), and an auxiliary storage apparatus (such as a hard disk), for example.

The input/output interface 105 is an interface to an input apparatus and an output apparatus. The input apparatus is, for example, an apparatus that receives a user operation (for example, a keyboard, a mouse, or the like). The output apparatus is, for example, a display apparatus (for example, a liquid crystal display or the like).

The RF circuits 107 are each an apparatus for performing radio communication, and processes a signal received via the corresponding antenna 109 or generates a signal transmitted via the antenna 109.

Although an example of the hardware configuration of the radio frame estimation apparatus 100 has been described with reference to FIG. 5, it is apparent that the hardware configuration of the radio frame estimation apparatus 100 is not limited to this example. For example, the radio frame estimation apparatus 100 may include other elements not illustrated in FIG. 5 and need necessarily not include one or more elements illustrated in FIG. 5 (for example, the input/output interface 105). For example, the radio frame estimation apparatus 100 may include two or more processors 101 instead of the single processor 101.

(2) Functional Configuration

Figure 6:
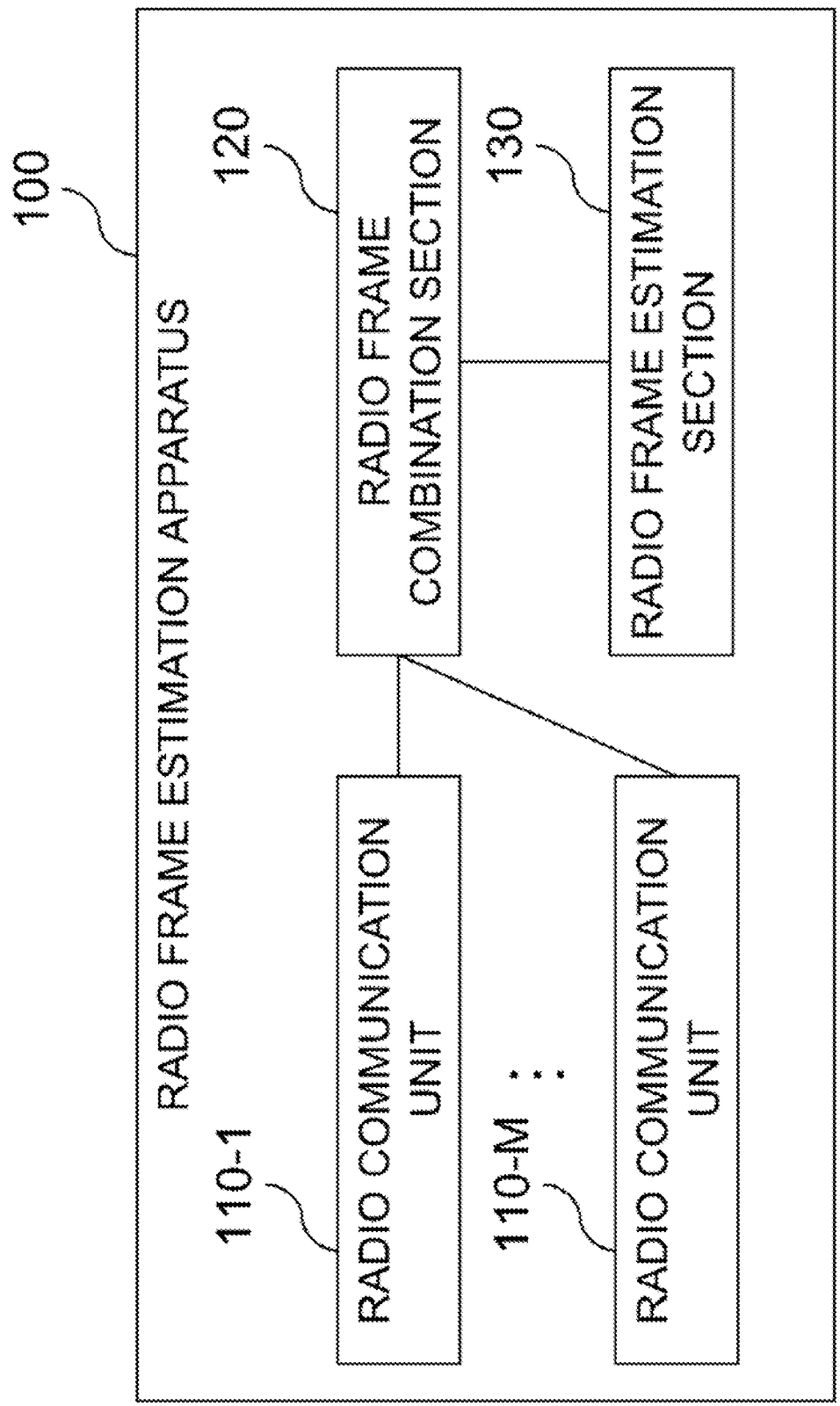
FIG. 6 is a block diagram illustrating an example of a schematic functional configuration of the radio frame estimation apparatus according to the first example embodiment.

FIG. 6 is a block diagram illustrating an example of a schematic functional configuration of the radio frame estimation apparatus 100 according to the first example embodiment. With reference to FIG. 6, the radio frame estimation apparatus 100 includes M radio communication units 110 (concretely, radio communication units 110-1, . . . , 110-M), a radio frame combination section 120, and a radio frame estimation section 130. As described above, M is an integer equal to or greater than 2.

Radio Communication Unit 110

Each of the radio communication units 110 monitors a radio frame set (in other words, a set of radio frames) in an environment where radio communication is performed (for example, an environment where the radio device 10 performs radio communication). For example, the radio communication unit 110 monitors a radio frame set transmitted using a radio channel in the environment.

Each of the radio communication units 110 may be a commercially available radio slave device. The plurality of radio communication units 110 may be radio slave units of the same model or may include radio slave devices of different models.

Radio Frame Estimation Section 120

The radio frame combination section 120 combines a plurality of radio frame sets (in other words, M radio frame sets) monitored by the plurality of radio communication units 110 (in other words, the M radio communication units 110) in an environment where radio communication is performed (for example, the environment where the radio devices 10 perform radio communication). By combining the plurality of radio frame sets, a combined radio frame set is obtained. In other words, by combining the plurality of radio frame sets, the radio frame combination section 120 generates the combined radio frame set. For example, the combined radio frame set is a union of the plurality of radio frame sets.

Radio Frame Estimation Section 130

The radio frame estimation section 130 performs estimation about the number of radio frames in the environment, based on the plurality of radio frame sets and the combined radio frame set. For example, the radio frame estimation section 130 performs the estimation, based on the number of radio frames included in each of the plurality of radio frame sets and the number of radio frames included in the combined radio frame set.

For example, the estimation includes estimating the number of radio frames that are not monitored by the plurality of radio communication units in the environment, estimating the number of all radio frames that are receivable in the environment (in other words, the true value of the number of radio frames), or estimating a ratio of radio frames monitored by each of the plurality of radio communication units.

Implementation

Each of the radio communication units 110 may be implemented with the RF circuit 107 and the antenna 109.

Each of the radio frame combination section 120 and the radio frame estimation section 130 may be implemented with the processor 101 and the memory 103. For example, the memory 103 may store a program (instructions), and the processor 101 may execute the program (instructions) to perform operations of the radio frame combination section 120 and the radio frame estimation section 130. In other words, the program may be a program for causing the processor 101 to execute the operations of the radio frame combination section 120 and the radio frame estimation section 130. The program may be updated by downloading via a network or by using a storage medium.

Note that implementation of the radio communication unit 110, the radio frame combination section 120, and the radio frame estimation section 130 is not limited to the example described above. For example, each of the radio communication unit 110, the radio frame combination section 120, and the radio frame estimation section 130 may be implemented with a semiconductor chip. Each of the radio communication unit 110, the radio frame combination section 120, and the radio frame estimation section 130 may be implemented with at least one of any hardware and any software.

<2.3. Configuration of Radio Device>

Figure 7:
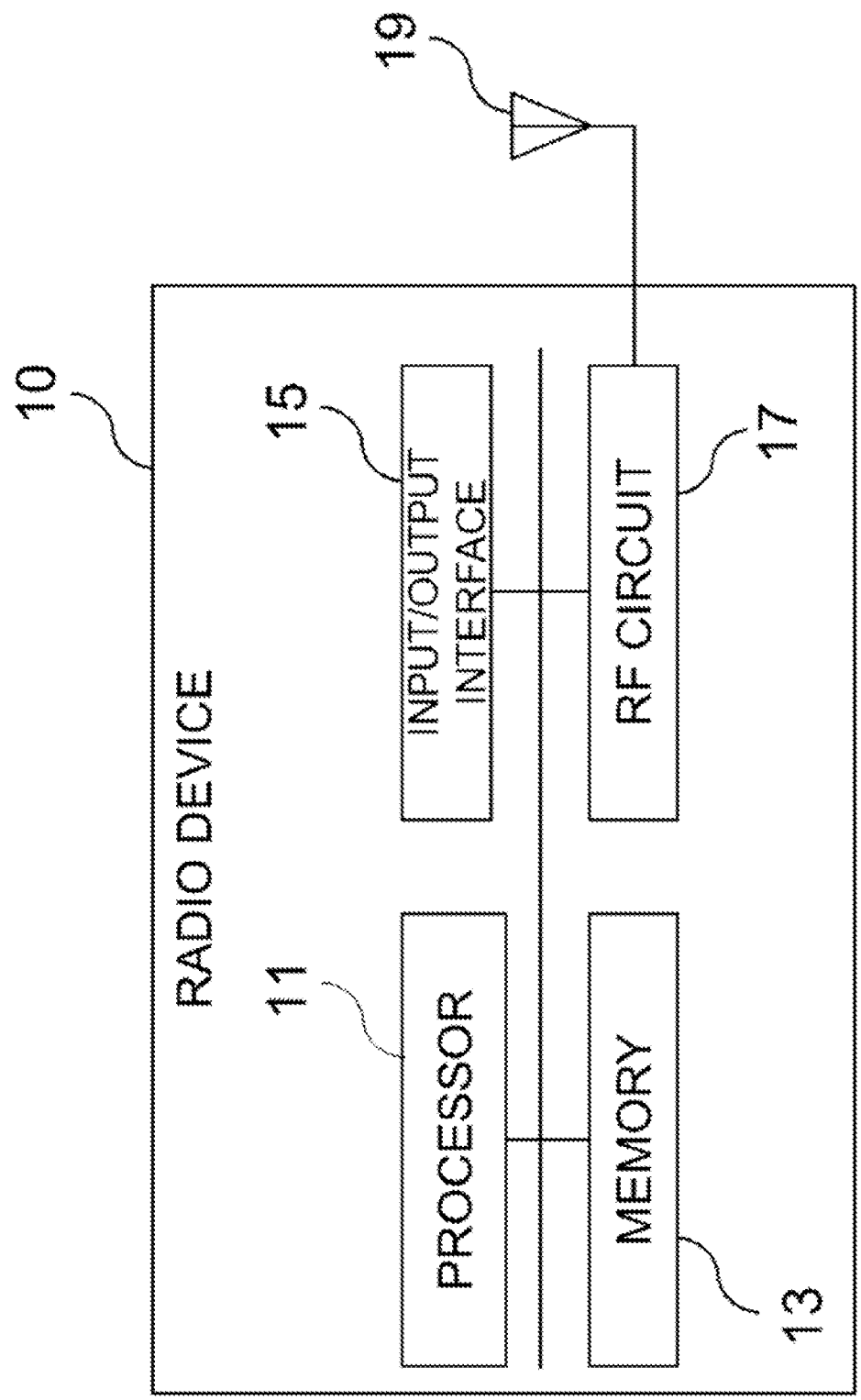
FIG. 7 is a block diagram illustrating an example of a schematic hardware configuration of the radio devices according to the first example embodiment.

FIG. 7 is a block diagram illustrating an example of a schematic hardware configuration of the radio device 10 according to the first example embodiment. With reference to FIG. 7, the radio device 10 includes a processor 11, a memory 13, an input/output interface 15, an RF circuit 17, and an antenna 19. The processor 11, the memory 13, the input/output interface 15, and the RF circuit 17 are connected to each other via an internal bus. The RF circuit 17 is connected to an antenna 19.

The processor 11 is, for example, a CPU and executes a program stored in the memory 13.

The memory 13 includes at least one of a RAM, a ROM, and an auxiliary storage apparatus (such as a hard disk), for example.

The input/output interface 15 is an interface to an input apparatus and an output apparatus.

The input apparatus is, for example, an apparatus that receives a user operation (for example, a keyboard, a mouse, or the like). The output apparatus is, for example, a display apparatus (for example, a liquid crystal display or the like).

The RF circuit 17 is an apparatus for performing radio communication, and processes a signal received via the antenna 19 or generates a signal transmitted via the antenna 19.

Although an example of the hardware configuration of the radio device 10 has been described with reference to FIG. 7, it is apparent that the hardware configuration of the radio device 10 is not limited to this example. For example, the radio device 10 may include other elements not illustrated in FIG. 7 and need necessarily not include one or more elements illustrated in FIG. 7 (for example, the input/output interface 15). For example, the radio device 10 may include two or more processors 11 instead of the single processor 11. For example, the radio device 10 may include two or more RF circuits 17 and two or more antennas 19 instead of the single RF circuit 17 and the single antenna 19.

<2.4. Operation>

A more detailed description will be given of the operation according to the first example embodiment with reference to FIGS. 8 to 10.

To facilitate understanding, a description will be given below by using, as a concrete example, a case where the radio frame estimation apparatus 100 includes two radio communication units 110 (in other words, a case where M=2). The two radio communication units 110 are a radio communication unit 110-1 (a first radio communication unit 110) and a radio communication unit 110-2 (a second radio communication unit 110). Note that the first example embodiment is, of course, not limited to this example and M may be an integer equal to or greater than 3.

Figure 8:
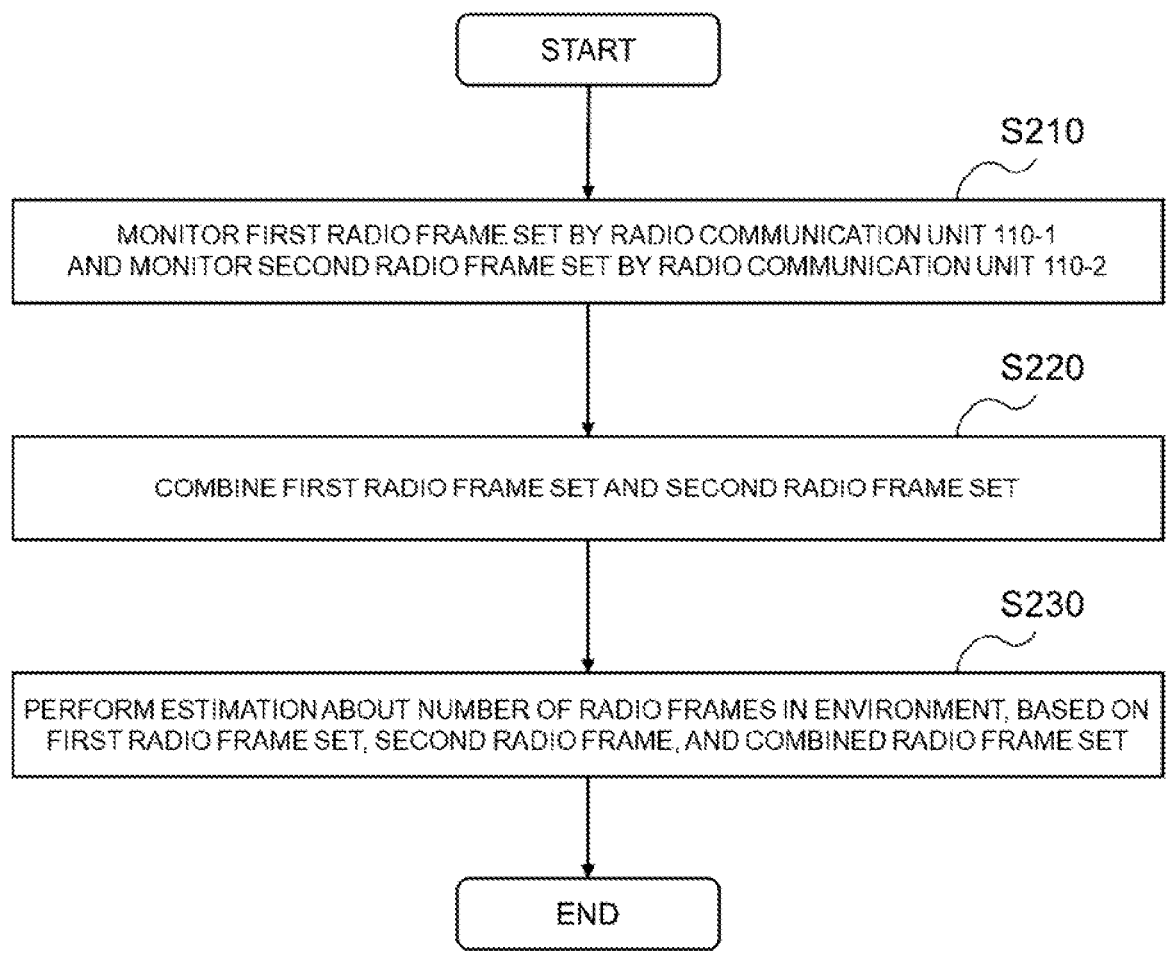
FIG. 8 is a flowchart for describing an example of a schematic flow of processing according to the first example embodiment.

FIG. 8 is a flowchart for describing an example of a schematic flow of processing according to the first example embodiment.

(1) S210: Monitoring of Radio Frame Sets

The radio communication unit 110-1 monitors a first radio frame set in an environment where radio communication is performed (for example, the environment where the radio device 10 performs radio communication), while the radio communication unit 110-2 monitors a second radio frame set in the environment. The radio communication unit 110-1 and the radio communication unit 110-2 may be started at the same timing or may be started at different timings at the monitoring of the radio frame sets.

For example, each of the radio communication unit 110-1 and the radio communication unit 110-2 may be a commercially available radio slave device and may be configured to be in a monitoring mode to monitor a radio frame set in a radio channel. For the monitoring of radio frames, the dumpcap command or the tshark command of a Linux (registered trademark) system may be used. Alternatively, the wireshark program of a Windows system may be used.

The first radio frame set monitored by the radio communication unit 110-1 and the second radio frame set monitored by the radio communication unit 110-2 are provided to the radio frame combination section 120.

(2) S220: Combination of Radio Frame Sets

The radio frame combination section 120 combines the first radio frame set and the second radio frame set. By combining the first radio frame set and the second radio frame set, a combined radio frame set is obtained. In other words, by combining the first radio frame set and the second radio frame set, the radio frame combination section 120 generates the combined radio frame set.

For example, the combined radio frame set is a union of the first radio frame set and the second radio frame set. Specifically, the combined radio frame set includes a common radio frame(s) included in both the first radio frame set and the second radio frame set, a radio frame(s) included only in the first radio frame set, and a radio frame(s) included only in the second radio frame set. Each of the common radio frames exists only once without duplication in the combined radio frame set.

First Example

FIG. 9 is an explanatory diagram for describing a first example of combination of radio frame sets. With reference to FIG. 9, the first radio frame set including radio frames 1, 2, 3, and 5 and the second radio frame set including radio frames 1, 3, 5, and 6 are combined, and the combined radio frame set including the radio frames 1, 2, 3, 5, and 6 are thereby generated.

The number expressing each radio frame is information differentiating the radio frame from the others. A sequence number or a time stamp of each radio frame instead of the number expressing the radio frame may be used as information differentiating the radio frame from the others. Alternatively, information included in each radio frame or part of the information, or information generated based on the information included in the radio frame or the part of the information (for example, a hash value generated by a hash function) may be used as the information for differentiating the radio frame from the others.

The combined radio frame set includes the common radio frames 1, 3, and 5 included in both the first radio frame set and the second radio frame set, the radio frame 2 included only in the first radio frame set, and the radio frame 6 included only in the second radio frame set. Each of the common radio frames 1, 3, and 5 exists only once without duplication in the combined radio frame set.

The combined radio frame set is provided to the radio frame estimation section 130 together with the first radio frame set and the second radio frame set.

Second Example

Figure 10:
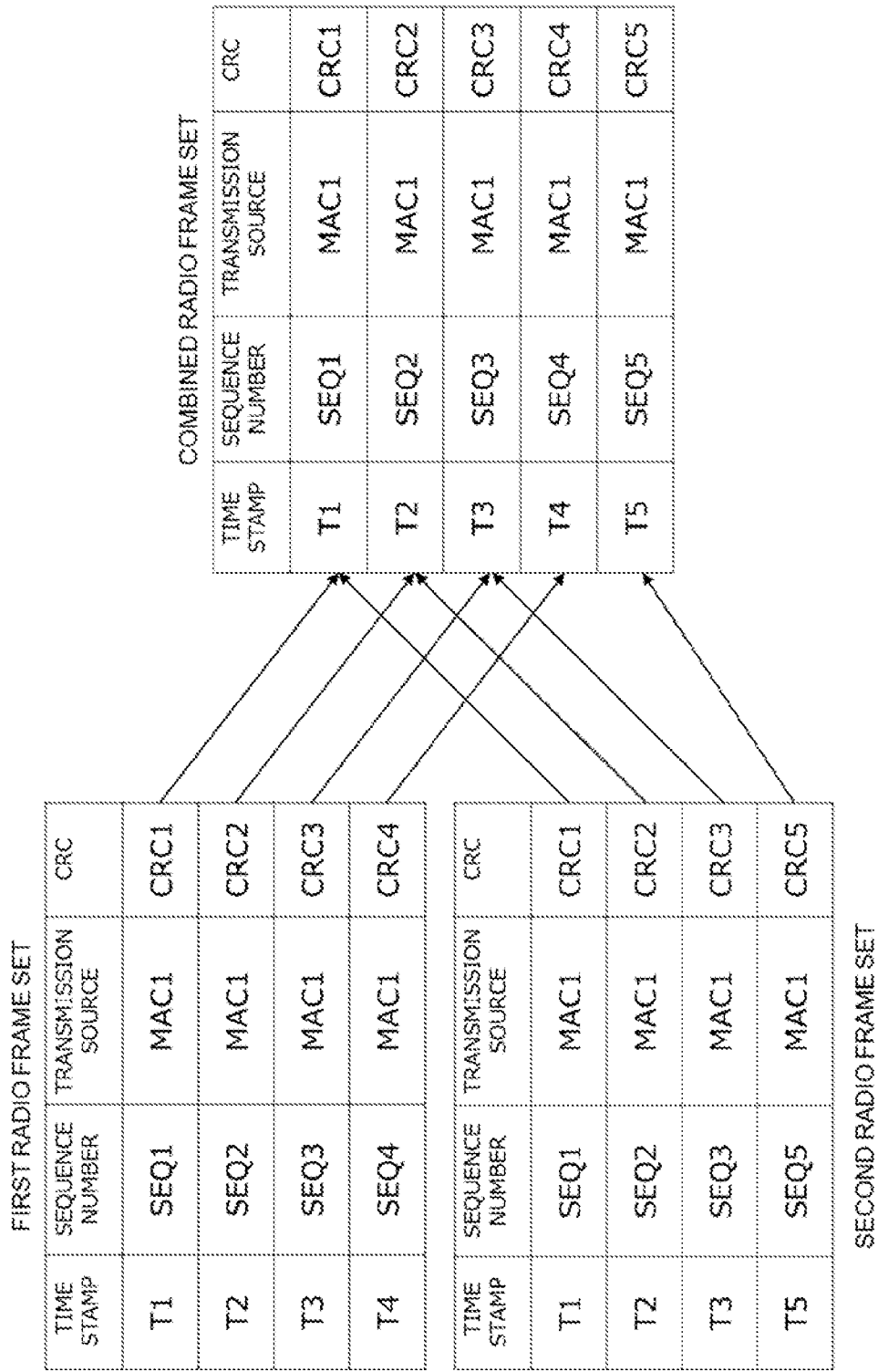
FIG. 10 is an explanatory diagram for describing a second example of the combination of radio frame sets.

FIG. 10 is an explanatory diagram for describing a second example of the combination of radio frame sets. With reference to FIG. 10, the first radio frame set including four radio frames and the second radio frame set including four radio frames are combined, and the combined radio frame set including five radio frames are thereby generated.

Each radio frame includes a time stamp, a sequence number, a transmission source, and a cyclic redundancy check (CRC). For example, the first radio frame in the first radio frame set includes a time stamp T1, a sequence number SEQ1, a transmission source media access control (MAC) address 1, and CRC1. The information illustrated in FIG. 10 is to facilitate description and understanding, and hence it is apparent that the information may not necessarily match information included in an actual radio frame. As an example, a radio frame of a certain type (for example, an acknowledgement (ACK) frame) does not include a sequence number. It is apparent that an actual radio frame may include another information such as a transmission source or radio wave information For example, in a case of combining the first radio frame set and the second radio frame set, it is determined whether or not each radio frame included in the first radio frame set is the same as any of the radio frames included in the second radio frame set. Determination of whether or not two radio frames are the same is made based on determination of whether or not pieces of information included in the two radio frames are the same. Concretely, for example, in a case where the time stamps of the two radio frames are the same (or the difference between the time stamps of the two radio frames is smaller than a predetermined threshold), or a case where CRCs of the two radio frames are the same, it is determined that the two radio frames are the same frames. Note that determination of whether or not the two radio frames are the same may be made based on two or more kinds of information included in the radio frames. Specifically, for example, in a case where the time stamps of the two radio frames are the same (or the difference between the time stamps of the two radio frames is smaller than a predetermined threshold) and also the CRCs of the two radio frames are the same, it may be determined that the two radio frames are the same frames.

For example, it is determined whether each of the common radio frames included in both the first radio frame set and the second radio frame set already exists in the combined radio frame set. If the common radio frame does not exist in the combined radio frame set yet, the common radio frame is added to the combined radio frame set.

The combined radio frame set is provided to the radio frame estimation section 130 together with the first radio frame set and the second radio frame set.

(3) S230: Estimation about the Number of Radio Frames in Environment

The radio frame estimation section 130 performs estimation about the number of radio frames in the environment, based on the first radio frame set, the second radio frame set, and the combined radio frame set. For example, the radio frame estimation section 130 performs the estimation, based on the number of radio frames included in the first radio frame set, the number of radio frames included in the second radio frame set, and the number of radio frames included in the combined radio frame set.

For example, the estimation includes estimating the number of radio frames that are not monitored by the radio communication unit 110-1 and the radio communication unit 110-2 in the environment, estimating the number of all radio frames that are receivable in the environment (in other words, the true value of the number of radio frames), or estimating the ratio of radio frames monitored by each of the plurality of radio communication units.

Concretely, for example, the number of radio frames included in the first radio frame set is denoted by A, the number of radio frames included in the second radio frame set is denoted by B, and the number of radio frames included in the combined radio frame set is denoted by C. Moreover, the number of all radio frames that are receivable in the environment (in other words, the true value of the number of radio frames) is denoted by N, the ratio of radio frames monitored by the radio communication unit 110-1 (the radio frame monitoring ratio) is denoted by x, and the ratio of radio frames monitored by the radio communication unit 110-2 (the radio frame monitoring ratio) is denoted by y.

Each radio frame monitoring ratio (x or y) is the ratio between the number of radio frames monitored by the radio communication unit 110 (A or B) and the number (N) of all the receivable radio frames. Hence, the following equations hold.

$$A = N \times x \quad \text{[Math. 1]}$$

$$B = N \times y \quad \text{[Math. 2]}$$

Based on these, the number (C) of radio frames included in the combined radio frame set is expressed by the following equation.

$$\begin{aligned} C &= N \times (1 - (1-x)(1-y)) \quad \text{[Math. 3]} \\ &= N \times (x + y) - xy) \\ &= N \times \frac{A}{N} + N \times \frac{B}{N} - \frac{A}{N} \times \frac{B}{N} \\ &= A + B - \frac{A \times B}{N} \end{aligned}$$

Hence, the number (N) of all the receivable radio frames can be calculated according to the following equation.

$$N = \frac{A \times B}{A + B - C} \quad \text{[Math. 4]}$$

Furthermore, the number of radio frames that are not monitored by the radio communication unit 110-1 and the radio communication unit 110-2 is calculated by N−C. The radio frame monitoring ratio x of the radio communication unit 110-1 is calculated by A/N, and the radio frame monitoring ratio y of the radio communication unit 110-2 is calculated by B/N.

Note that such calculations are possible, since the radio communication unit 110-1 and the radio communication unit 110-2 are independent of each other, and hence the radio frames that are not monitored by the radio communication unit 110-1 and the radio frames that are not monitored by the radio communication unit 110-2 are also independent of each other.

The example of the schematic flow of the processing according to the first example embodiment has been described above with reference to FIG. 8. The processing illustrated in FIG. 8 may be repeatedly performed.

(4) Effects

The estimation about the number of radio frames in an environment where radio communication is performed as described above. Concretely, for example, the number of radio frames that are not monitored by the radio communication units 110 in the environment where radio communication is performed (for example, N−C), the number of all radio frames that are receivable in the environment (for example, N), or the ratio of radio frames monitored by each of the radio communication units 110 (for example, x or y) may be estimated. With this estimation, for example, the time period in which the radio channel is used is more accurately calculated, which can consequently improve accuracy of estimating the use rate of the radio channel.

<2.5. First Example Alteration>

A description will be given of a first example alteration of the first example embodiment with reference to FIGS. 11 to 13.

(1) Configuration of Radio Frame Estimation Apparatus 100

Figure 11:
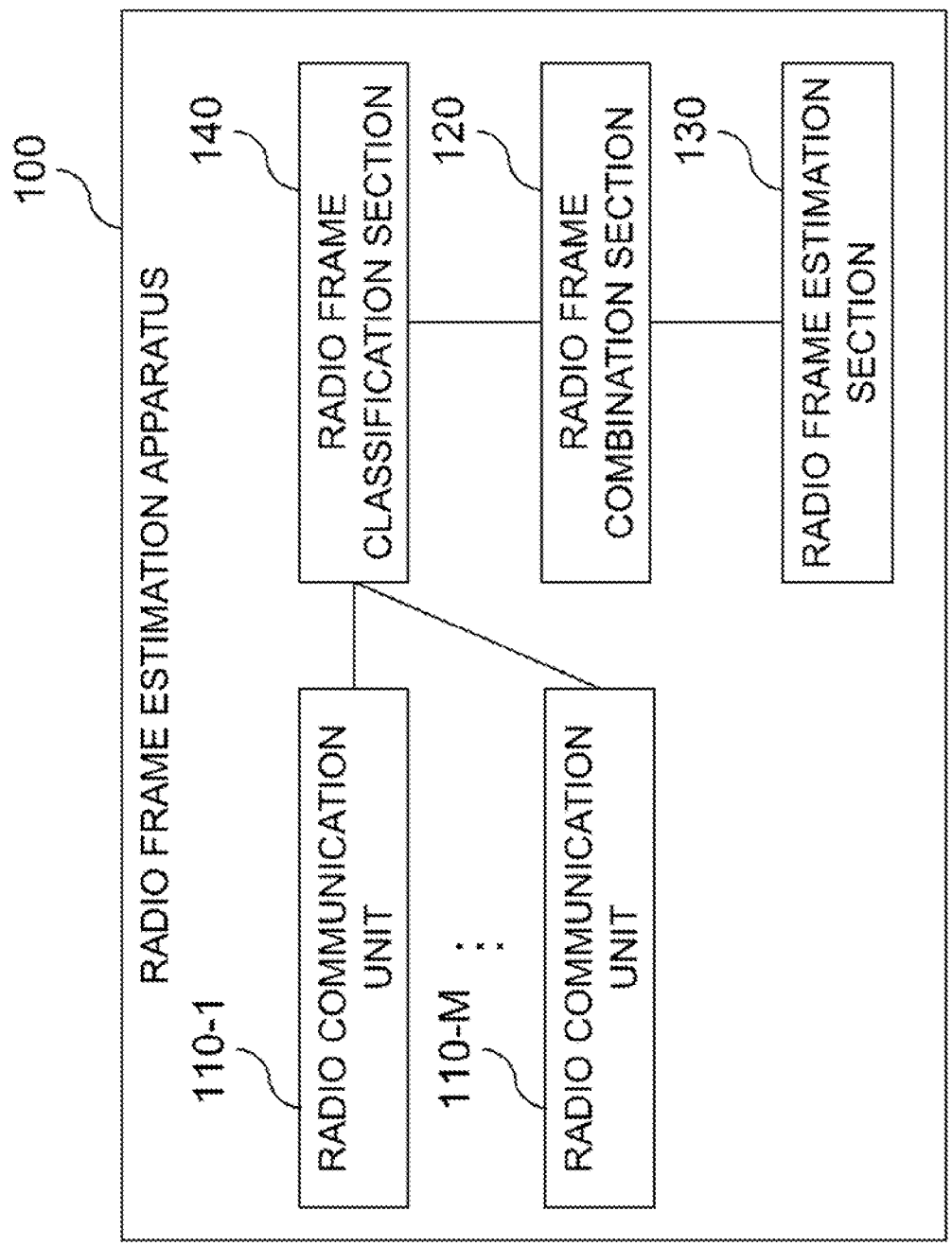
FIG. 11 is a block diagram illustrating an example of a schematic functional configuration of a radio frame estimation apparatus according to a first example alteration of the first example embodiment.

FIG. 11 is a block diagram illustrating an example of a schematic functional configuration of a radio frame estimation apparatus 100 according to the first example alteration of the first example embodiment. With reference to FIG. 11, particularly in the first example alteration, the radio frame estimation apparatus 100 further includes a radio frame classification section 140.

A radio frame classification section 140 classifies the radio frames included in each of the plurality of radio frame sets monitored by the plurality of radio communication units 110 into groups. For example, the radio frame classification section 140 classifies the radio frames included in each of the plurality of radio frame sets into groups, based on a classification rule specified in advance (or a classification rule generated).

The radio frame combination section 120 combines the plurality of radio frame sets for each group.

The radio frame estimation section 130 performs the estimation about the number of radio frames in the environment, for each group.

(2) Operation

Figure 12:
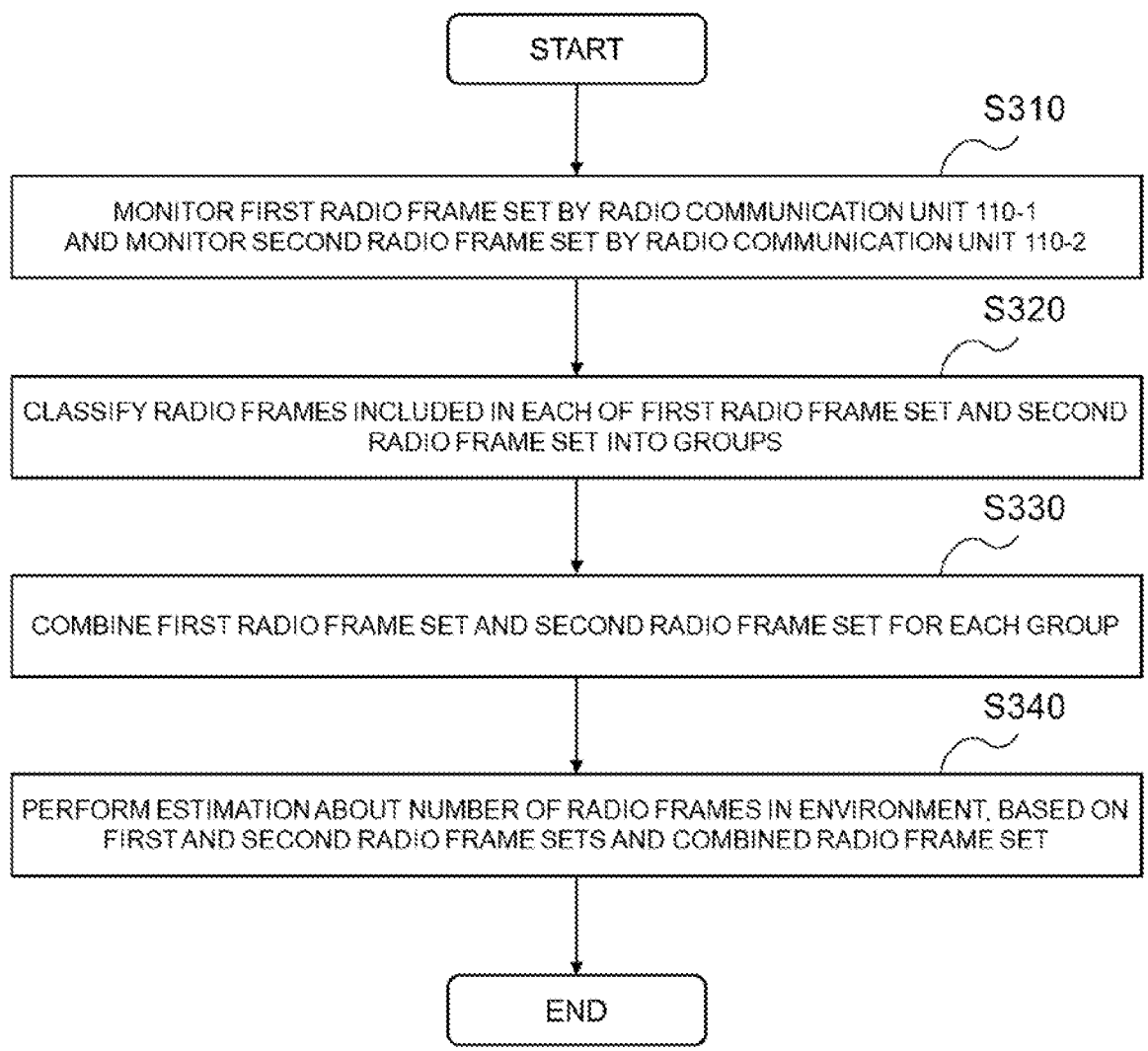
FIG. 12 is a flowchart for describing an example of a schematic flow of processing according to the first example alteration of the first example embodiment.

FIG. 12 is a flowchart for describing an example of a schematic flow of processing according to the first example alteration of the first example embodiment.

To facilitate understanding, a description will be given below by using, as a concrete example, a case where the radio frame estimation apparatus 100 includes two radio communication units 110 (in other words, a case where M=2). The two radio communication units are a radio communication unit 110-1 (a first radio communication unit 110) and a radio communication unit 110-2 (a second radio communication unit 110). Note that the first example alteration of the first example embodiment is, of course, not limited to this example and M may be an integer equal to or greater than 3.

S310: Monitoring of Radio Frame Sets

The radio communication unit 110-1 monitors a first radio frame set in an environment where radio communication is performed (for example, the environment where the radio device 10 performs radio communication), while the radio communication unit 110-2 monitors a second radio frame set in the environment.

A more detailed description of the operation in step S310 is the same as the description of the operation in step S210 described with reference to FIG. 8. Hence, overlapping descriptions are omitted here.

The first radio frame set monitored by the radio communication unit 110-1 and the second radio frame set monitored by the radio communication unit 110-2 are provided to the radio frame classification section 140.

S320: Classification of Radio Frames

The radio frame classification section 140 classifies the radio frames included in each of the first radio frame set and the second radio frame set into groups, based on the classification rule specified in advance.

For example, the classification rule indicates classifying the radio frames, based on at least one of communication speed, radio field strength, a type of the radio frame, a flag described in a header of the radio frame, and part or all of a character string included in the radio frame. Specifically, the radio frame classification section 140 classifies the radio frames included in each of the first radio frame set and the second radio frame set into groups, based on at least one of communication speed, radio field strength, a type of the radio frame, a flag described in a header of the radio frame, and part or all of a character string included in the radio frame.

Example of Classification

Figure 13:
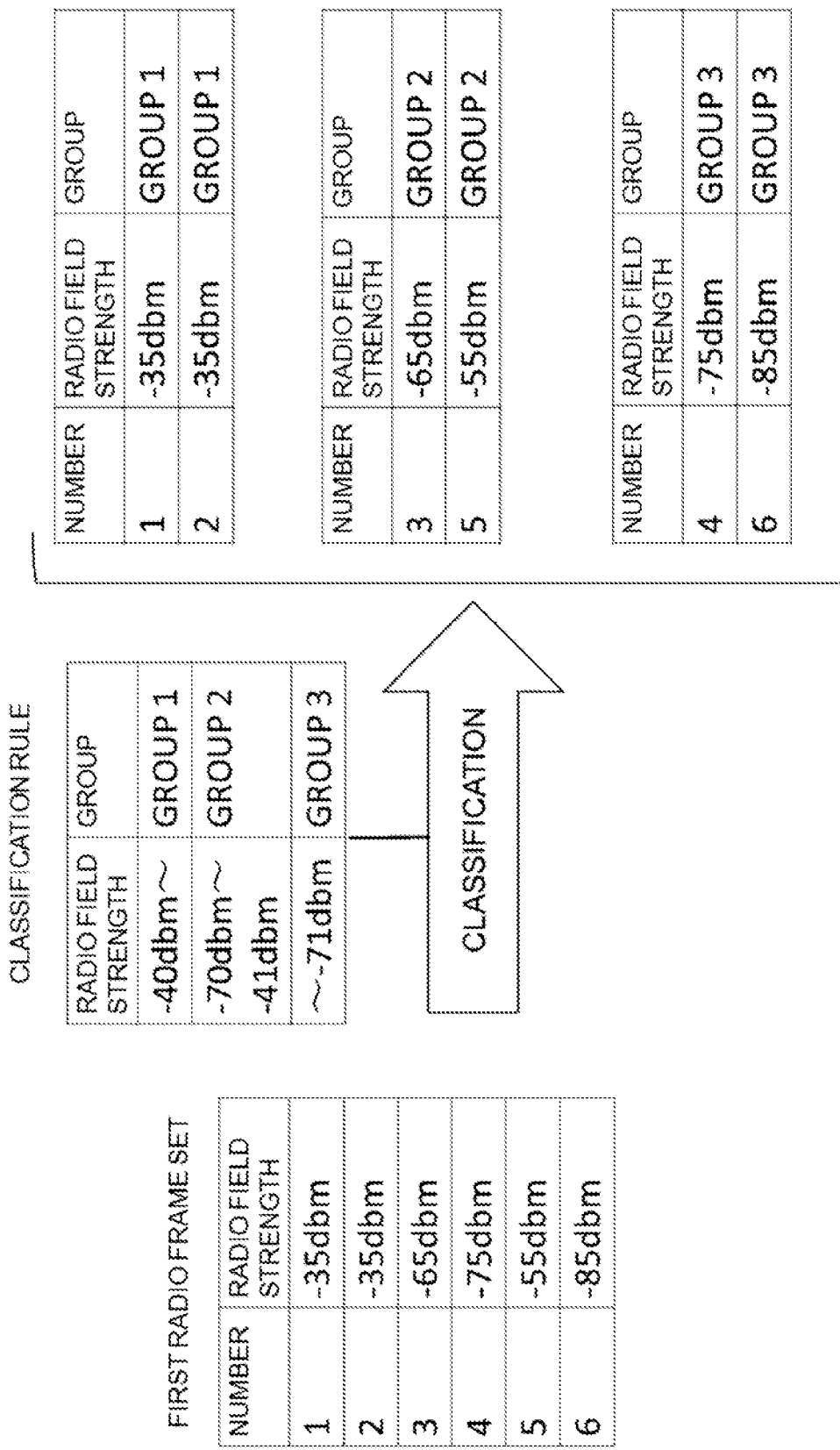
FIG. 13 is an explanatory diagram for describing an example of classification of radio frames.

FIG. 13 is an explanatory diagram for describing an example of classification of radio frames. With reference to FIG. 13, the first radio frame set including radio frames 1 to 6 is illustrated.

First, classifying radio frames into three groups according to radio field strength is specified in advance as the classification rule. The numeric values (radio field strength) illustrated in FIG. 13 are examples, and it is apparent that the first example alteration is not limited to this example.

The radio frame classification section 140 performs determination of the radio field strength of each of the radio frames included in the first radio frame set and classifies the radio frames included in the first radio frame set into group 1, group 2, or group 3. The radio frame classification section 140 similarly classifies the radio frames included in the second radio frame set.

The first radio frame set and the second radio frame set after the classification are provided to the radio frame combination section 120.

S330: Combination of Radio Frame Sets

The radio frame combination section 120 combines the first radio frame set and the second radio frame set for each group. For example, the radio frame combination section 120 combines the radio frame that is included in the first radio frame set and is in group 1, and the radio frame that is included in the second radio frame set and is in group 1. Combination is similarly performed for group 2 and group 3.

The combined radio frame set obtained by the combination is provided to the radio frame estimation section 130 together with the first radio frame set and the second radio frame set.

S340: Estimation about the Number of Radio Frames in Environment

The radio frame estimation section 130 performs estimation, for each group, about the number of radio frames in the environment, based on the first radio frame set, the second radio frame set, and the combined radio frame set. Hence, an estimation result for each group is obtained.

The example of the schematic flow of the processing according to the first example alteration of the first example embodiment has been described above with reference to FIG. 12. The processing illustrated in FIG. 12 may be repeatedly performed.

(3) Effects

The radio frames that are not monitored have a tendency. For example, a radio frame of lower radio field strength may have a lower probability of being monitored. A radio frame having higher communication speed may have a shorter communication time and may hence have a lower probability of being monitored. As described above, depending on the characteristics of each radio frame, the probability that the radio frame is monitored (or the probability that the radio frame is not monitored) may vary. Hence, according to the first example alteration of the first example embodiment, by estimating, for each group, radio frames having similar characteristics, an estimation result for each group is obtained, which can improve accuracy of the estimation.

<2.6. Second Example Alteration>

A description will be given of a second example alteration of the first example embodiment with reference to FIGS. 14 and 15.

(1) Configuration of Radio Frame Estimation Apparatus 100

Figure 14:
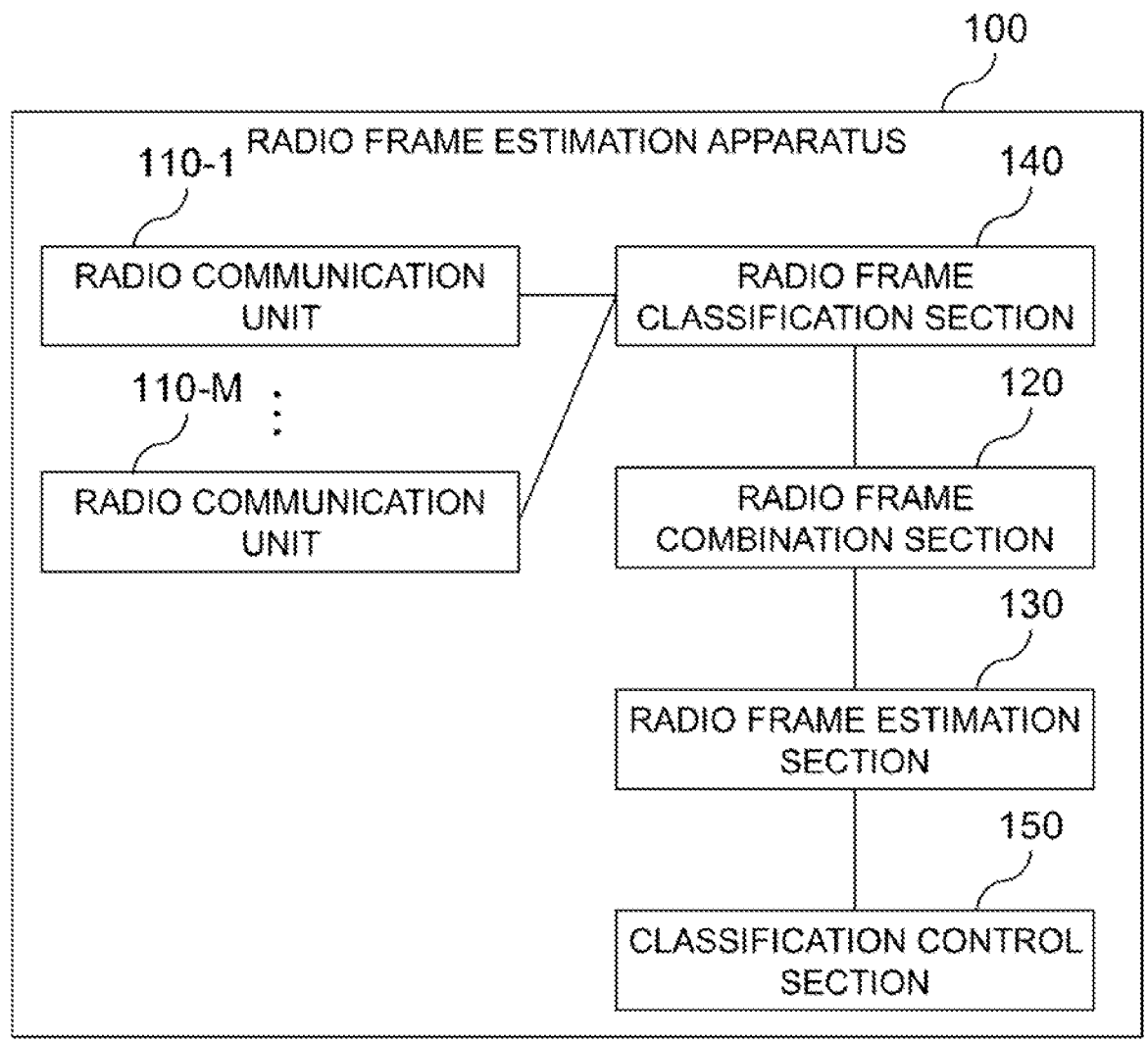
FIG. 14 is a block diagram illustrating an example of a schematic functional configuration of a radio frame estimation apparatus according to a second example alteration of the first example embodiment.

FIG. 14 is a block diagram illustrating an example of a schematic functional configuration of a radio frame estimation apparatus 100 according to the second example alteration of the first example embodiment. With reference to FIG. 14, particularly in the second example alteration, the radio frame estimation apparatus 100 further includes a classification control section 150.

The radio frame classification section 140 classifies, based on a classification rule, the radio frames included in each of the plurality of radio frame sets monitored by the plurality of radio communication units 110 into groups. The radio frame combination section 120 combines the plurality of radio frame sets for each group. The radio frame estimation section 130 performs the estimation about the number of radio frames in the environment, for each group.

Particularly in the second example alteration, the classification control section 150 controls the classification rule, based on the result of the estimation for each group. For example, the classification control section 150 calculates accuracy of the estimation, based on the result of the estimation for each group, and controls the classification rule, based on the accuracy of the estimation. As an example, the classification control section 150 changes the classification rule when the accuracy of the estimation is lower than predetermined accuracy.

(2) Operation

Figure 15:
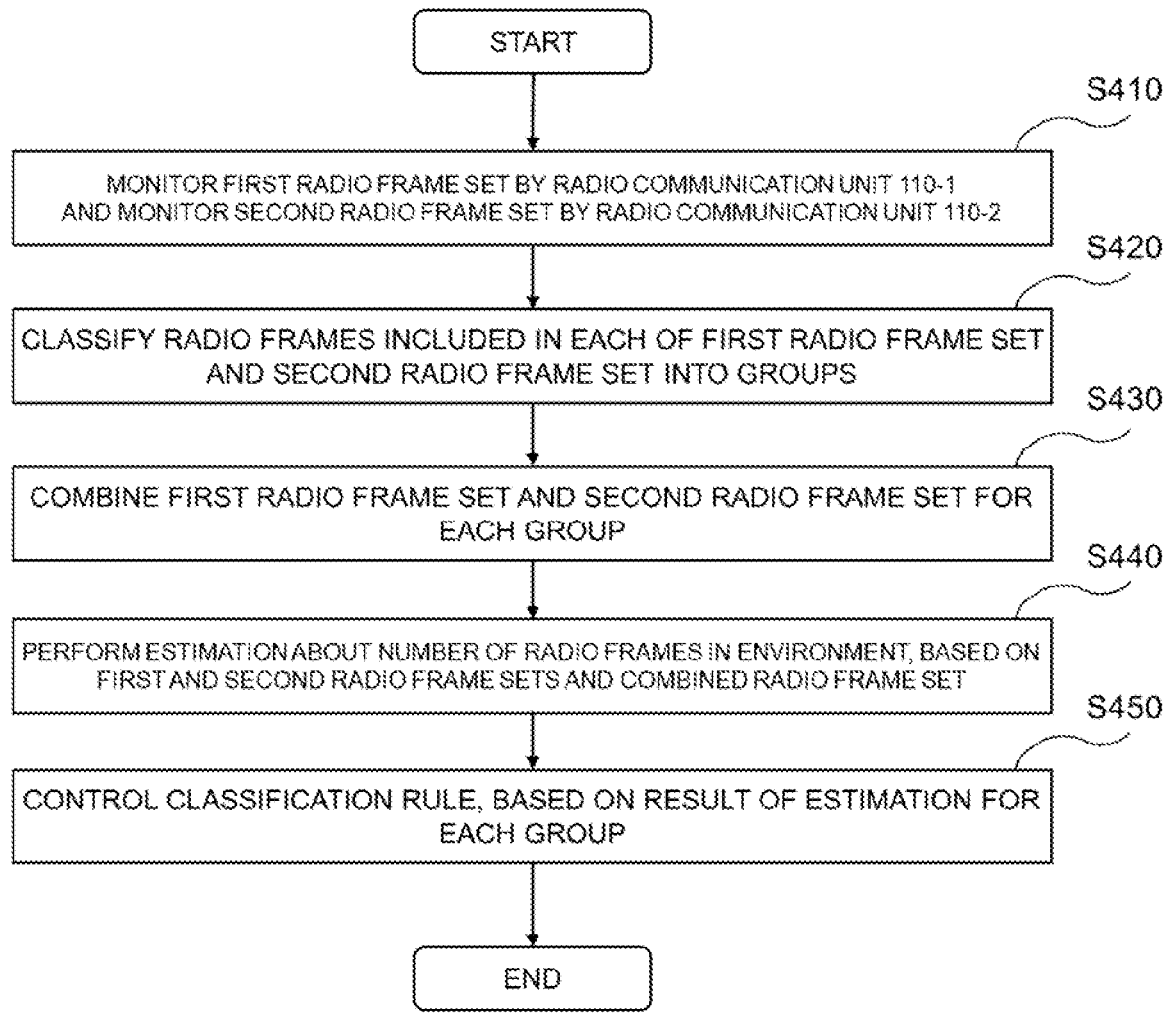
FIG. 15 is a flowchart for describing an example of a schematic flow of processing according to the second example alteration of the first example embodiment.

FIG. 15 is a flowchart for describing an example of a schematic flow of processing according to the second example alteration of the first example embodiment.

To facilitate understanding, a description will be given below by using, as a concrete example, a case where the radio frame estimation apparatus 100 includes two radio communication units 110 (in other words, a case where M=2). The two radio communication units are a radio communication unit 110-1 (a first radio communication unit 110) and a radio communication unit 110-2 (a second radio communication unit 110). Note that the second example alteration of the first example embodiment is, of course, not limited to this example and M may be an integer equal to or greater than 3.

S410: Monitoring of Radio Frame Sets

The radio communication unit 110-1 monitors a first radio frame set in an environment where radio communication is performed (for example, the environment where the radio device 10 performs radio communication), while the radio communication unit 110-2 monitors a second radio frame set in the environment.

A more detailed description of the operation in step S410 is the same as the description of the operation in step S310 described with reference to FIG. 12. Hence, overlapping descriptions are omitted here.

S420: Classification of Radio Frames

The radio frame classification section 140 classifies the radio frames included in each of the first radio frame set and the second radio frame set into groups, based on the classification rule.

A more detailed description of the operation in step S420 is the same as the description of the operation in step S320 described with reference to FIG. 12. Hence, overlapping descriptions are omitted here.

S430: Combination of Radio Frame Sets

The radio frame combination section 120 combines the first radio frame set and the second radio frame set for each group.

A more detailed description of the operation in step S430 is the same as the description of the operation in step S330 described with reference to FIG. 12. Hence, overlapping descriptions are omitted here.

S440: Estimation about the Number of Radio Frames in Environment

The radio frame estimation section 130 performs estimation, for each group, about the number of radio frames in the environment, based on the first radio frame set, the second radio frame set, and the combined radio frame set. Hence, an estimation result for each group is obtained.

S450: Control of Classification Rule

The classification control section 150 controls the classification rule, based on the result of the estimation for each group.

Concretely, for example, the classification control section 150 evaluates effects of classification according to the classification rule, based on the result of the estimation for each group. As an example, the classification control section 150 calculates accuracy of the estimation, based on the result of the estimation for each group. For example, the classification control section 150 calculates the accuracy of the estimation, based on the result of the estimation for each group and a correct answer value obtained separately. The correct answer value may be calculated based on the sequence numbers in the radio frames included in the combined radio frame set. Concretely, by taking into account that sequence numbers are normally sequential, the number of radio frames that are not monitored may be calculated by counting a missing sequence number(s). Alternatively, the correct answer value may be obtained externally (for example, from the radio device 10).

Furthermore, for example, the classification control section 150 controls the classification rule, based on the accuracy of the estimation. As an example, the classification control section 150 changes the classification rule when the accuracy of the estimation is lower than predetermined accuracy.

For example, the classification control section 150 transmits an indication of change of the classification rule or an indication of maintenance of the classification rule to the radio frame classification section 140, for feedback to the radio frame classification section 140. For example, when the accuracy of the estimation is lower than the predetermined accuracy, an indication of change of the classification rule is transmitted, and when the accuracy of the estimation is higher than the predetermined accuracy, an indication of maintenance of the classification rule is transmitted.

The example of the schematic flow of the processing according to the second example alteration of the first example embodiment has been described above with reference to FIG. 15. The processing illustrated in FIG. 15 may be repeatedly performed.

(3) Effects

According to the second example alteration of the first example embodiment, for example, the classification rule is changed when estimation accuracy is low, which can consequently improve the estimation accuracy by a new classification rule.

<2.7. Third Example Alteration>

In the above-described examples of the first example embodiment, the radio frame estimation apparatus 100 includes the plurality of radio communication units 110. However, the first example embodiment is not limited to these examples.

In a third example alteration of the first example embodiment, a radio frame estimation apparatus 100 may not necessarily include the plurality of radio communication units 110. For example, each of the plurality of radio communication units 110 may be located outside the radio frame estimation apparatus 100. Each of the plurality of radio communication units 110 may monitor a radio frame set and transmit the radio frame set to the radio frame estimation apparatus 100.

3. Second Example Embodiment

A description will be given of a second example embodiment of the present invention with reference to FIGS. 16 and 17. The above-described first example embodiment is a concrete example embodiment, whereas the second example embodiment is a more generalized example embodiment.

<3.1. Configuration of Radio Frame Estimation Apparatus>

Figure 16:
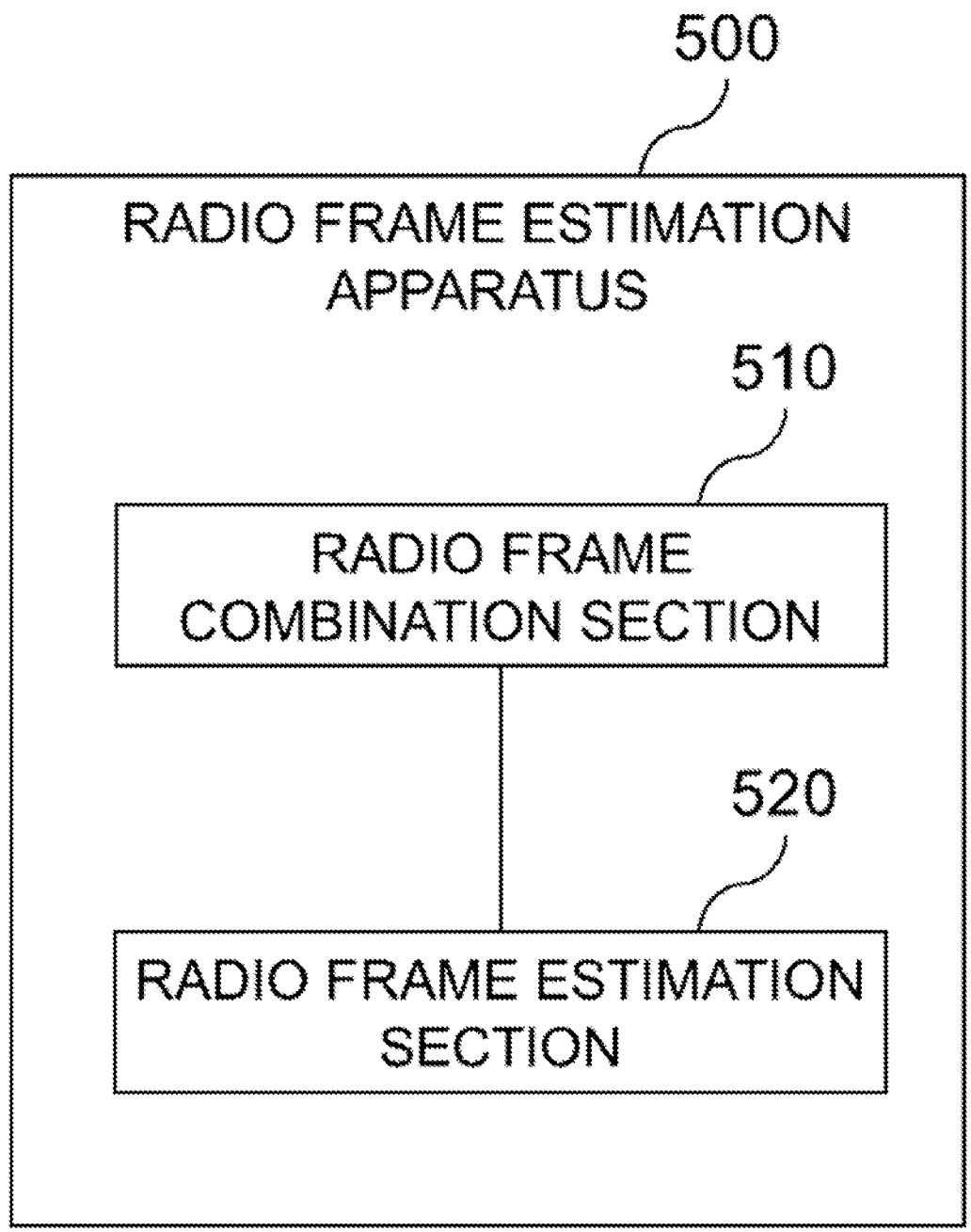
FIG. 16 is a block diagram illustrating an example of a schematic functional configuration of a radio frame estimation apparatus according to a second example embodiment.

FIG. 16 is a block diagram illustrating an example of a schematic functional configuration of a radio frame estimation apparatus 500 according to the second example embodiment. With reference to FIG. 16, the radio frame estimation apparatus 500 includes a radio frame combination section 510 and a radio frame estimation section 520.

(1) Radio Frame Combination Section 510

The radio frame combination section 510 combines a plurality of radio frame sets monitored by a plurality of radio communication units 110 in an environment where radio communication is performed.

A more detailed description of the radio frame combination section 510 is the same as the description of the radio frame combination section 120 according to the first example embodiment except for the difference in reference signs, for example. Hence, overlapping descriptions are omitted here. However, the radio frame combination section 510 is, of course, not limited to this example.

(2) Radio Frame Estimation Section 520

The radio frame estimation section 520 performs estimation about the number of radio frames in the environment, based on the plurality of radio frame sets and a combined radio frame set obtained by combining the plurality of radio frame sets.

A more detailed description of the radio frame estimation section 520 is the same as the description of the radio frame estimation section 130 according to the first example embodiment except for the difference in reference signs, for example. Hence, overlapping descriptions are omitted here. However, the radio frame estimation section 520 is, of course, not limited to this example.

(3) Implementation

The hardware configuration of the radio frame estimation apparatus 500 may be the same as the hardware configuration of the radio frame estimation apparatus 100 according to the first example embodiment described with reference to FIG. 5. In this case, each of the radio frame combination section 510 and the radio frame estimation section 520 may be implemented with the processor 101 and the memory 103. For example, the memory 103 may store a program (instructions), and the processor 101 may execute the program (instructions) to perform operations of the radio frame combination section 510 and the radio frame estimation section 520. In other words, the program may be a program for causing the processor 101 to execute the operations of the radio frame combination section 510 and the radio frame estimation section 520. However, the radio frame estimation apparatus 500 is, of course, not limited to this example.

<3.2. Operation>

Figure 17:
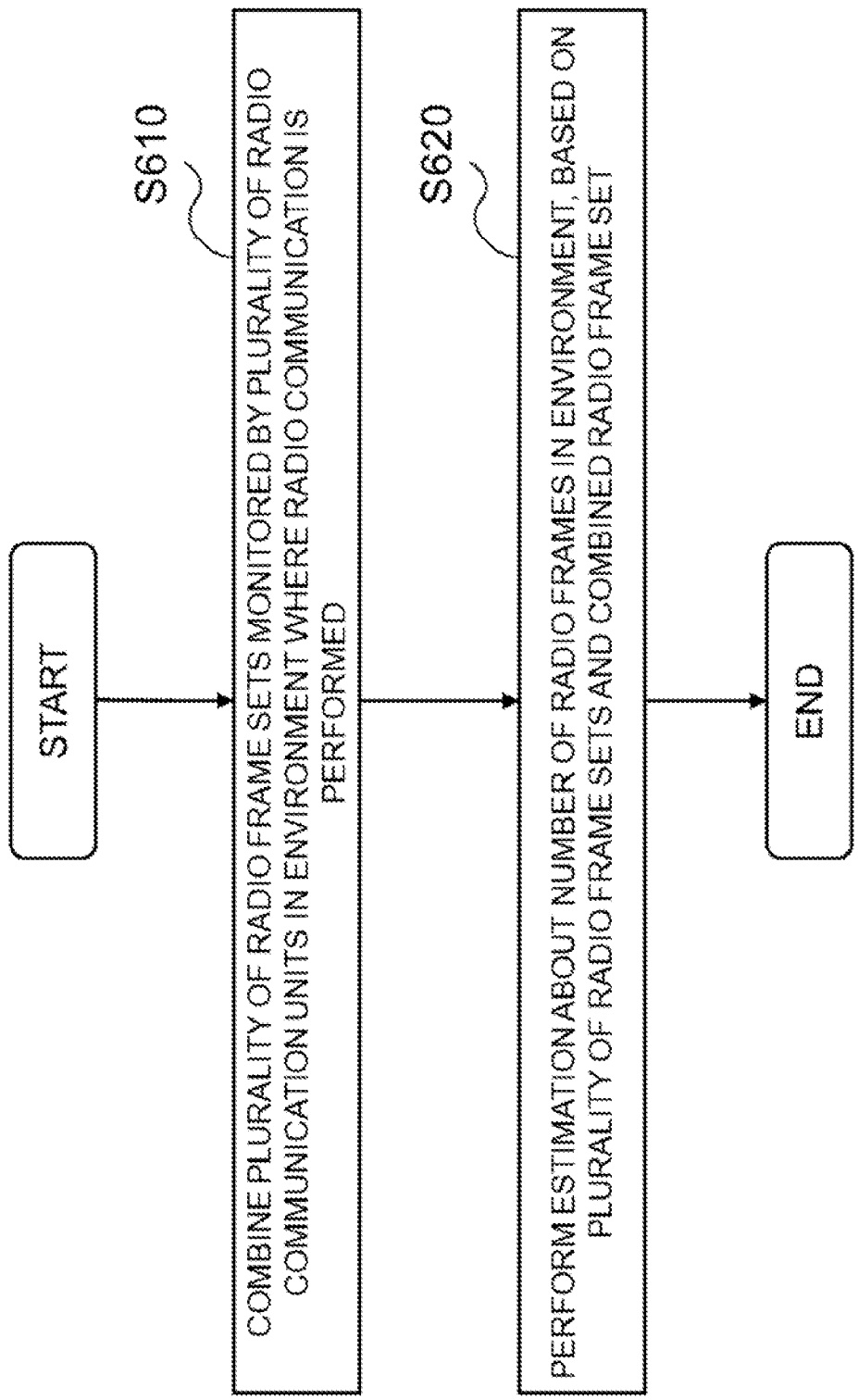
FIG. 17 is a flowchart for describing an example of a schematic flow of processing according to the second example embodiment.

FIG. 17 is a flowchart for describing an example of a schematic flow of processing according to the second example embodiment.

The radio frame combination section 510 combines a plurality of radio frame sets monitored by a plurality of radio communication units 110 in an environment where radio communication is performed (S610).

The radio frame estimation section 520 performs estimation about the number of radio frames in the environment, based on the plurality of radio frame sets and a combined radio frame set obtained by combining the plurality of radio frame sets (S620).

A further detailed description of S610 and step S620 is the same as the description of step S220 and step S230 according to the first example embodiment described with reference to FIG. 8 except for the difference in reference signs, for example. Hence, overlapping descriptions are omitted here. Note that the second example embodiment is, of course, not limited to this example.

According to the second example embodiment, for example, the time period in which the radio channel is used is more accurately calculated, which can consequently improve accuracy of estimating the use rate of the radio channel.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

Methods including processing of the constituent elements of the radio frame estimation apparatus described in the Specification (for example, one or more of the radio frame combination section, the radio frame estimation section, the radio frame classification section, and the classification control section) may be provided, and programs for causing a processor to execute processing of the constituent elements may be provided. Moreover, non-transitory computer readable recording media having recorded thereon the programs may be provided. It is apparent that such methods, programs, and non-transitory computer readable recording media are also included in the present invention.

The whole or part of the example embodiments disclosed above can be described as, but not limited to, the following supplementary notes.

[Supplementary Note 1]

A radio frame estimation apparatus including:

a radio frame combination section configured to combine a plurality of radio frame sets monitored by a plurality of radio communication units in an environment where radio communication is performed; and a radio frame estimation section configured to perform estimation about a number of radio frames in the environment based on the plurality of radio frame sets and a combined radio frame set obtained by combining the plurality of radio frame sets.

[Supplementary Note 2]

The radio frame estimation apparatus according to supplementary note 1, wherein the estimation includes estimating a number of radio frames that are not monitored by the plurality of radio communication units in the environment, estimating a number of all radio frames that are receivable in the environment, or estimating a ratio of radio frames monitored by each of the plurality of radio communication units.

[Supplementary Note 3]

The radio frame estimation apparatus according to supplementary note 1 or 2, wherein the radio frame estimation section is configured to perform the estimation based on a number of radio frames included in each of the plurality of radio frame sets and a number of radio frames included in the combined radio frame set.

[Supplementary Note 4]

The radio frame estimation apparatus according to any one of supplementary notes 1 to 3, wherein the plurality of radio communication units are a first radio communication unit and a second radio communication unit, and the plurality of radio frame sets are a first radio frame set monitored by the first radio communication unit and a second radio frame set monitored by the second radio communication unit.

[Supplementary Note 5]

The radio frame estimation apparatus according to any one of supplementary notes 1 to 4, further including a radio frame classification section configured to classify radio frames included in each of the plurality of radio frame sets into groups, wherein the radio frame combination section is configured to combine the plurality of radio frame sets for each group, and the radio frame estimation section is configured to perform the estimation for each group.

[Supplementary Note 6]

The radio frame estimation apparatus according to supplementary note 5, wherein the radio frame classification section is configured to classify the radio frames included in each of the plurality of radio frame sets into groups based on a classification rule specified in advance.

[Supplementary Note 7]

The radio frame estimation apparatus according to supplementary note 5 or 6, wherein the radio frame classification section is configured to classify the radio frames included in each of the plurality of radio frame sets into groups based on at least one of communication speed, radio field strength, a type of the radio frame, a flag described in a header of the radio frame, and part or all of a character string included in the radio frame.

[Supplementary Note 8]

The radio frame estimation apparatus according to any one of supplementary notes 5 to 7, wherein the radio frame classification section is configured to classify the radio frames included in each of the plurality of radio frame sets into groups based on a classification rule, and the radio frame estimation apparatus further includes a classification control section configured to control the classification rule based on a result of the estimation for each group.

[Supplementary Note 9]

The radio frame estimation apparatus according to supplementary note 8, wherein the classification control section is configured to calculate accuracy of the estimation based on the result of the estimation for each group, and control the classification rule based on the accuracy of the estimation.

[Supplementary Note 10]

The radio frame estimation apparatus according to supplementary note 9, wherein the classification control section is configured to change the classification rule when the accuracy of the estimation is lower than predetermined accuracy.

[Supplementary Note 11]

A system including:

a radio frame combination section configured to combine a plurality of radio frame sets monitored by a plurality of radio communication units in an environment where radio communication is performed; and a radio frame estimation section configured to perform estimation about a number of radio frames in the environment based on the plurality of radio frame sets and a combined radio frame set obtained by combining the plurality of radio frame sets.

[Supplementary Note 12]

A method including:

combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

[Supplementary Note 13]

A program that causes a processor to execute:

combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

[Supplementary Note 14]

A non-transitory computer readable recording medium having recorded thereon a program that causes a processor to execute:

combining a plurality of radio frame sets monitored by a plurality of radio communication units in an environment where radio communication is performed; and performing estimation about a number of radio frames in the environment based on the plurality of radio frame sets and a combined radio frame set obtained by combining the plurality of radio frame sets.

REFERENCE SIGNS LIST

1 System
10 Radio Device 100, 500 Radio Frame Estimation Apparatus
110 Radio Communication Unit
120, 510 Radio Frame Combination Section
130, 520 Radio Frame Estimation Section
140 Radio Frame Classification Section
150 Classification Control Section

What is claimed is:

1. A radio frame estimation apparatus comprising:
a memory storing instructions; and
one or more processors configured to execute the instructions to:
combine a plurality of radio frame sets monitored by a plurality of radio communication units in an environment where radio communication is performed; and
perform estimation about a number of radio frames in the environment based on the plurality of radio frame sets and a combined radio frame set obtained by combining the plurality of radio frame sets.

2. The radio frame estimation apparatus according to claim 1, wherein
the estimation includes
estimating a number of radio frames that are not monitored by the plurality of radio communication units in the environment,
estimating a number of all radio frames that are receivable in the environment, or
estimating a ratio of radio frames monitored by each of the plurality of radio communication units.

3. The radio frame estimation apparatus according to claim 1, wherein the one or more processors are configured to perform the estimation based on a number of radio frames included in each of the plurality of radio frame sets and a number of radio frames included in the combined radio frame set.

4. The radio frame estimation apparatus according to claim 1, wherein
the plurality of radio communication units are a first radio communication unit and a second radio communication unit, and
the plurality of radio frame sets are a first radio frame set monitored by the first radio communication unit and a second radio frame set monitored by the second radio communication unit.

5. The radio frame estimation apparatus according to claim 1, wherein the one or more processors are further configured to
classify radio frames included in each of the plurality of radio frame sets into groups,
combine the plurality of radio frame sets for each group, and
perform the estimation for each group.

6. The radio frame estimation apparatus according to claim 5, wherein the one or more processors are configured to classify the radio frames included in each of the plurality of radio frame sets into groups based on a classification rule specified in advance.

7. The radio frame estimation apparatus according to claim 5, wherein the one or more processors are configured to classify the radio frames included in each of the plurality of radio frame sets into groups based on at least one of communication speed, radio field strength, a type of the radio frame, a flag described in a header of the radio frame, and part or all of a character string included in the radio frame.

8. The radio frame estimation apparatus according to claim 5, wherein the one or more processors are further configured to
classify the radio frames included in each of the plurality of radio frame sets into groups based on a classification rule, and
control the classification rule based on a result of the estimation for each group.

9. The radio frame estimation apparatus according to claim 8, wherein the one or more processors are configured to
calculate accuracy of the estimation based on the result of the estimation for each group, and
control the classification rule based on the accuracy of the estimation.

10. The radio frame estimation apparatus according to claim 9, wherein the one or more processors are configured to change the classification rule when the accuracy of the estimation is lower than predetermined accuracy.

11. A method comprising:
combining a plurality of radio frame sets monitored by a plurality of radio communication units in an environment where radio communication is performed; and
performing estimation about a number of radio frames in the environment based on the plurality of radio frame sets and a combined radio frame set obtained by combining the plurality of radio frame sets.

12. A non-transitory computer readable recording medium having recorded thereon a program that causes a processor to execute:
combining a plurality of radio frame sets monitored by a plurality of radio communication units in an environment where radio communication is performed; and
performing estimation about a number of radio frames in the environment based on the plurality of radio frame sets and a combined radio frame set obtained by combining the plurality of radio frame sets.

* * * * *